(12) United States Patent
Chen et al.

(10) Patent No.: US 11,372,984 B2
(45) Date of Patent: Jun. 28, 2022

(54) KEY-COMPRESSIBLE ENCRYPTION

(71) Applicant: International Business Machines Corporation, Armonk, NY (US)

(72) Inventors: Doron Chen, Gvat'aim (IL); Michael Factor, Haifa (IL); Danny Harnik, Tel Mond (IL); Eliad Tsfadia, Rosh Haayin (IL)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 16/540,088

(22) Filed: Aug. 14, 2019

(65) Prior Publication Data
US 2021/0049283 A1 Feb. 18, 2021

(51) Int. Cl.
*H04L 29/06* (2006.01)
*G06F 21/60* (2013.01)
*H04L 9/40* (2022.01)

(52) U.S. Cl.
CPC ........ *G06F 21/602* (2013.01); *H04L 63/0478* (2013.01); *G06F 2221/2107* (2013.01)

(58) Field of Classification Search
CPC ........... G06F 21/602; G06F 2221/2107; H04L 63/0478
USPC ....................................................... 713/164
See application file for complete search history.

(56) References Cited

U.S. PATENT DOCUMENTS

| | | | | |
|---|---|---|---|---|
| 6,341,164 B1* | 1/2002 | Dilkie | ................ | H04L 9/0825 380/278 |
| 8,037,244 B2* | 10/2011 | Muto | ................ | G06F 11/1076 711/114 |
| 8,200,593 B2* | 6/2012 | Guillen | ................ | G06N 3/10 706/27 |
| 8,949,513 B2* | 2/2015 | Huang | ................ | G06F 12/0246 711/103 |
| 9,710,333 B2* | 7/2017 | Lumb | ................ | G06F 16/1748 |
| 9,892,053 B2* | 2/2018 | Nilsson | ................ | G06F 12/0897 |
| 9,916,248 B2* | 3/2018 | Sugimoto | ........... | G06F 12/0804 |
| 2010/0020966 A1* | 1/2010 | Hata | ................ | H04L 9/0861 380/44 |
| 2010/0313040 A1* | 12/2010 | Lumb | ................ | G06F 3/0623 713/193 |

(Continued)

OTHER PUBLICATIONS

Shweta Agrawal; Functional Encryption: New Perspectives and Lower Bounds; Springer:2013; p. 500-518.*

*Primary Examiner* — Monjur Rahim
(74) *Attorney, Agent, or Firm* — Gregory J Kirsch (57) ABSTRACT

Embodiments of the present systems and methods may provide techniques to provide host side encryption while maintaining compression and deduplication benefits and providing communication between the host and the storage system that does not leak information about the data compressibility/deduplication properties. For example, in an embodiment, a method may comprise compressing, at a computer system, an original sector of data, generating a new sector of data including a first part including metadata and padding data, and a second part including the original sector of data that has been compressed and encrypted using a data encryption key (DEK), encrypting, at the computer system, the new sector of data using a data reduction key (DRK), and transmitting, at the computer system, the encrypted new sector of data to a storage system.

17 Claims, 6 Drawing Sheets

(56) References Cited

U.S. PATENT DOCUMENTS

| | | | | |
|---|---|---|---|---|
| 2016/0292446 | A1* | 10/2016 | Lawrence | H04L 63/0478 |
| 2017/0286319 | A1* | 10/2017 | Abbas | G06F 3/0676 |
| 2018/0196947 | A1* | 7/2018 | Davis | G06F 21/6218 |
| 2019/0065788 | A1* | 2/2019 | Vijayasankar | G06F 21/78 |
| 2019/0109869 | A1* | 4/2019 | Bailey | H04L 9/14 |
| 2019/0340136 | A1* | 11/2019 | Irwin | G06F 3/0683 |

* cited by examiner

202: Compress the sector. Let x be the size of the sector after compression.

204: If the data does not compress by more than k bytes, encrypt the original data with the DEK and send this encrypted sector to the storage.

206: Otherwise, create a prefix (or suffix) of size SECTOR_SIZE − x. The prefix may comprise metadata (an encoding of the compressed length) plus a sequence of zeros.

208: Concatenate:

210: (SECTOR_SIZE − x) bytes of the prefix

212: xbytes of the compressed sector, encrypted using DEK 214: Encrypt this concatenation using the DRK

302: Use DRK to decrypt the sector

304: If the prefix does not contain a long sequence of zeros, then this is not a compressible sector. Store the original sector (before the DRK decryption).

306: Otherwise, write the result onto the storage. This result is:

308: (SECTOR_SIZE – x) bytes of the compressible prefix (unencrypted)

310: xbytes of the compressed sector, encrypted using DEK

Fig. 4

402: If the stored data for the sector contains a k byte padding prefix then encrypt the sector using DRK and send to the host.

404: Otherwise, send the full sector to the host as is.

502: Use DRK to decrypt the sector.

504: If the decrypted sector does not contain a padding prefix, then use the DEK to decrypt the original received sector (before decryption with DRK).

506: Otherwise, retrieve from the prefix the two metadata bytes containing the size of the compressed sector (this is as a parameter for the decompression)

508: Use DEK to decrypt the compressed sector

510: Decompress sector to a full SECTOR_SIZE bytes

Fig. 6

KEY-COMPRESSIBLE ENCRYPTION

BACKGROUND

The present invention relates to techniques that to provide encryption of data while maintaining compression and deduplication benefits and providing communication that does not leak information about the data compressibility/deduplication properties.

Many modern storage systems have built in data reduction capabilities which use compression and/or deduplication technologies in order to save space and better utilize the storage. This practice, depending on the actual content that is being stored, can greatly reduce the storage cost. However, an up and coming trend in data centers and cloud storage is to use host side encryption—namely, to encrypt the data as it leaves the application server, before being sent to the storage, delivering an end-to-end encryption. Such practice brings security benefits, but the data that reaches the storage system is already in encrypted form and can no longer be compressed (typical encrypted data has no compression or deduplication potential).

Thus, a problem arises when attempting to provide host side encryption while maintaining compression and deduplication benefits. One conventional approach is to compress the data in the host before it is encrypted. However, this raises a new challenge—that compressed data is of variable length and requires complex data structures/algorithms to manage the data layout on the storage (such as log structures array and address maps). This is especially true if one wants to support random reads of sectors in the data. These mapping structures are the type of machinery that is built into a storage system that has built-in compression support. However, such mechanisms are typically not available on the host side.

Conventional solutions exist that perform compression and encryption at the host side but leak information about the data compressibility/deduplication properties. Thus, a problem arises when attempting to provide communication between the host and the storage system to be such that an adversary listening in on it would learn very little about the compressibility of the data. Information about data compressibility could be used by adversaries trying gain some information about the unencrypted data.

Accordingly, a need arises for techniques to provide host side encryption while maintaining compression and deduplication benefits while providing communication between the host and the storage system that does not leak information about the data compressibility/deduplication properties.

SUMMARY

Embodiments of the present systems and methods may provide techniques to provide host side encryption while maintaining compression and deduplication benefits and providing communication between the host and the storage system that does not leak information about the data compressibility/deduplication properties.

For example, in an embodiment, a method may be implemented in a computer system comprising a processor, memory accessible by the processor, computer program instructions stored in the memory and executable by the processor, and data stored in the memory and accessible by the processor, and the method may comprise generating, at the computer system, a new sector of data by (1) creating a new sector consisting of a first part which includes a few byte of metadata and padding of compressible data (for example, a sequence of zeros), and a second part which includes the original sector of data that has been compressed and encrypted using a data encryption key (DEK), and (2) encrypting, at the computer system, the new transformed sector of data using a data reduction key (DRK), and then transmitting, at the computer system, the encrypted new sector of data to a storage system. These are the actions at the host in a write operation, where the sector being written is sufficiently compressible.

In embodiments, when the original sector of data cannot be compressed beyond a predetermined amount, the method may encrypt, at the computer system, the uncompressed original sector of data using a data encryption key (DEK), and transmitting, at the computer system, the encrypted uncompressed original sector of data to a storage system. These are the actions at the host in a write operation, where the sector being written is not sufficiently compressible.

The storage system may attempt to decrypt the sector sent to it by the host side, using the DRK key. The presence or absence of padding data may be used by the storage system to determine whether the transmitted data is compressed, and if so it will store the decrypted new sector of data, and if not, it will revert back to the original sector which was sent by the host, and store it without modifications. These are the actions at the storage system in a write operation.

When determining whether the sector sent by the host side was originally compressible, the storage system may attempt to decrypt just the beginning of the sector using the DRK. If the beginning of the sector does not contain the compressible data pattern (for example, a sequence of zeros), then the storage needs not decrypt the rest of the sector, and may store it without further modifications.

The method may further comprise checking, at the storage system, whether a requested sector contains a sequence of compressible padding data (for example, a sequence of zeros), if so to encrypt it using the DRK and send it to the host, and if not, to send it to the host as-is. These are the actions at the storage system in a read operation.

The method may further comprise receiving, at the computer system, a sector of data from the storage system, decrypting, at the computer system, at least a portion of the encrypted sector of data using the DRK, determining, at the computer system, based on the presence or absence of compressible padding data, whether the sector of data includes compressed data. If the sector is determined to be compressed, the method decrypts, at the computer system, the compressed data using the DEK and decompresses, at the computer system, the decrypted compressed data. If the sector of data is determined not to be compressed, the method decrypts, at the computer system, the encrypted sector of data. These are the actions at the host in a read operation.

The metadata in the compressed sectors may comprise a value indicating the compressed length of the original sector of data that has been compressed, which could be used by the host as a parameter for the decompression algorithm. When the storage system supports deduplication, the method may further comprise encrypting data using the DEK and an initialization vector generated, at the computer system, generated from the sector data (for example, using a keyed hash), that is identical for sectors of identical data.

In an embodiment, a system may comprise a processor, memory accessible by the processor, computer program instructions stored in the memory and executable by the processor, and data stored in the memory and accessible by the processor to perform compressing an original sector of data, generating a new sector of data including a first part including metadata and padding data, and a second part including the original sector of data that has been compressed and encrypted using a data encryption key (DEK), encrypting the new sector of data using a data reduction key (DRK), and transmitting the encrypted new sector of data to a storage system.

In an embodiment, a computer program product may comprise a non-transitory computer readable storage having program instructions embodied therewith, the program instructions executable by a computer, to cause the computer to perform a method comprising compressing, at the computer system, an original sector of data, generating a new sector of data including a first part including metadata and padding data, and a second part including the original sector of data that has been compressed and encrypted using a data encryption key (DEK), encrypting, at the computer system, the new sector of data using a data reduction key (DRK), and transmitting, at the computer system, the encrypted new sector of data to a storage system.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide techniques to provide host side encryption while maintaining compression and deduplication benefits while providing communication between the host and the storage system that does not leak information about the data compressibility/deduplication properties. Embodiments may perform "key-compressible encryption"—an encryption method that may allow a storage system holding a data reduction key to gain some of the compression and deduplication benefits of the data. Further, any adversary that does not hold the data reduction key will learn no, or very little, information about the data reduction properties of the data.

In embodiments, every encrypted sector written to the storage controller may be written with its original sector size and offset, keeping the storage responsible for the data layout, and keeping the host oblivious of the need to manage the compressed blocks. Embodiments may compress a data sector (if it is sufficiently compressible) and create a new sector (with the same length as the original sector) consisting of two parts. One part may include, for example, a few metadata bytes and a compressible pattern (for example, a sequence of zeros). The second part may include the compressed data encrypted using the data encryption key (DEK). In the most general setting, these two parts are concatenated and then encrypted using the Data Reduction Key (DRK) and sent to the storage system. In embodiments, the DEK and DRK may be symmetric keys, used both for encryption and decryption, while in other embodiments, non-symmetric or different keys may be used for encryption and decryption (for example, private and public keys).

A storage system that holds the DRK may then decrypt the second encryption layer and store the data. If the storage system has data compression capabilities, it may store the sector in compressed form (for example, by removing the compressible padding). The storage system may never see the data in the clear and may not have access to the DEK, but does learn the data compressibility. An eavesdropper learns nothing about the data (as if it were encrypted with no compression). An additional benefit is the ability to tie the data reduction capabilities to a specific storage system. In addition, embodiments may include a number of optimizations including support of deduplication, and performance optimizations.

Figure 1:
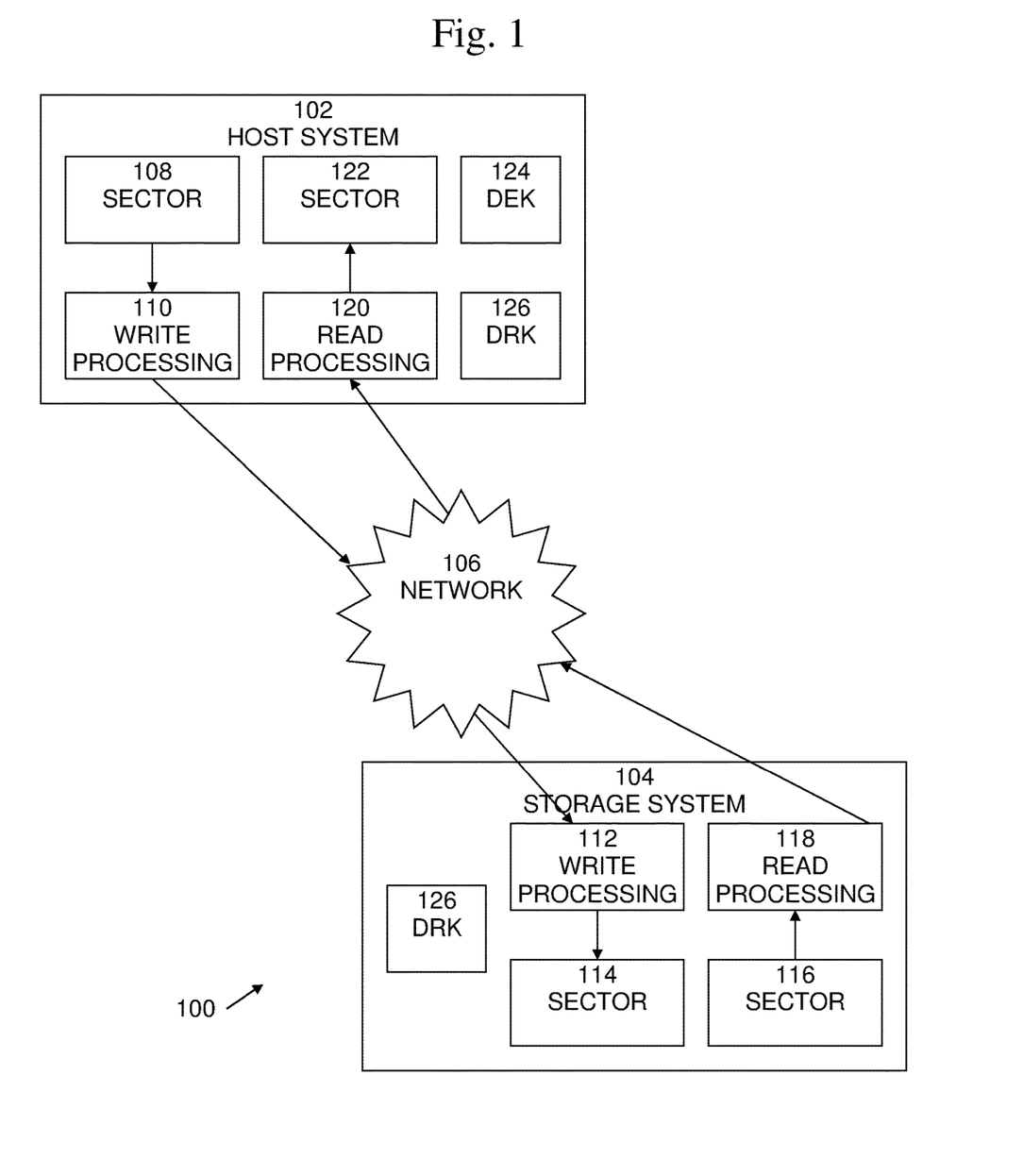
FIG. 1 is an exemplary block diagram of a system according to embodiments of the present techniques.

An exemplary block diagram of a system 100, according to embodiments of the present techniques, is shown in FIG. 1. In this example, system 100 may include a host system 102, a storage system 104, and a network 106. Typically, host system may be one or more computer systems that may store data, such as sector 108 on a storage system 104, and may retrieve data from storage system 104. Host system 102 may include any type of computer system, such as personal computers, workstations, smartphones, tablet computers, server systems, etc. Likewise, storage system 104 may include any type of computer system, such as personal computers, workstations, smartphones, tablet computers, server systems, etc., but typically include server systems for storing large amounts of data. Network 106 may provide communications between host system 102 and storage system 104. Such communications may be bi-directional, direct or indirect, etc. Network 106 may include any number and any combination of networks, such as local area networks, wide area networks, standard or proprietary networks, private or public networks, etc., but typically may include the Internet.

For example, in a sector write operation, host system 102 may write sector 108 to storage system 104 by performing host write processing 110 on sector 108, and transmitting the processed sector to storage system 104, which may perform storage system write processing 112 on the received processed sector and store the resulting data as sector 114. Likewise, host system 102 may read stored sector 116 from storage system 104 by causing storage system 104 to perform storage system read processing 118 on stored sector 112 and transmitting the processed sector to host system 102, which may perform host system read processing 120 on the received processed sector to obtain the resulting data, sector 122. Write processing 110 and read processing 120 on host system 102 may be performed using Data Encryption Key (DEK) 124, and in some circumstances, as described below, using Data Reduction Key (DRK) 126. Write processing 112 and read processing 118 on storage system 104 may be performed using Data Reduction Key (DRK) 126. Storage system 104 does not use, and has no knowledge of Data Encryption Key (DEK) 124. The operation of system 100 is described further below with reference to FIGS. 2, 3, 4, and 5.

In general, embodiments of processes may be carried out at the host for each data block, sector, or chunk. For simplicity, the term sector may be used herein, but it is to be understood that the term sector does not refer only to physical storage sectors, but rather refers to any block, sector, chunk, or other amount of data. A data sector may be compressed and encrypted using the DEK. The encrypted compressed sector data may then be concatenated with compressible padding to form a sector of the original length. Some metadata may also be added as part of the padding. The new padded block may then be encrypted with the DRK and sent to the storage.

Figure 2:
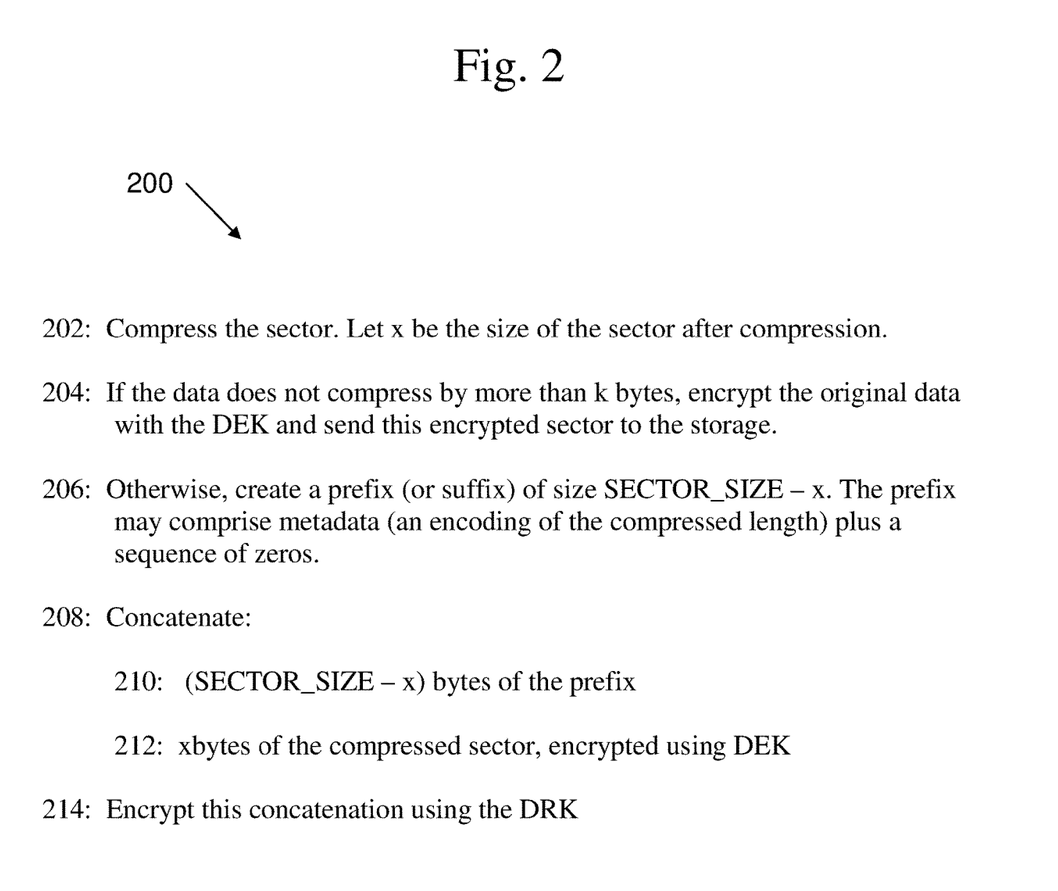
FIG. 2 is an exemplary pseudocode diagram of a write operation of a single sector on the host side according to embodiments of the present systems and methods.

An exemplary flow diagram of a host system process 200 of writing data to a storage system 104 according to the present techniques is shown in FIG. 2. It is best viewed in conjunction with FIG. 1. Host side write process 200 may begin at 202, in which a sector (or block or chunk) of data to be stored 108 may be compressed. Let x be the size of the sector after compression. At 204, if the sector data 108 has not been compressed at 204 by more than k bytes, then the original uncompressed sector 108 may be encrypted using Data Encryption Key (DEK) 124 and the encrypted uncompressed sector may be sent to storage system 104 for storage. At 206, if the sector 108 has been compressed at 204 by k or more bytes, then a prefix (or suffix, the present techniques may be applied to either or both) may be created, the prefix having a size equal to the original sector size minus the size of the sector after compression (SECTOR_SIZE-x). The prefix may include metadata (for example, an encoding of the compressed length) plus a compressible sequence of, for example, zeros. At 208, the prefix of size (SECTOR_SIZE-x) 210 may be concatenated with the x bytes of the compressed sector that has been encrypted using the DEK 212. At 214, the concatenated data may be encrypted using the Data Reduction Key (DRK) 126 and the encrypted compressed sector data may be sent to storage system 104 for storage.

Depending on the encryption method, there may be limitations on the sizes of messages that may be encrypted using the DEK. If that is the case, the value x will denote the rounding up of the size of the sector after compression, to a size which can be encrypted using the DEK.

It is to be noted that all of the bytes sent to the storage system may be encrypted by the host. As a result, an adversary listening to the communications between the host and the storage system does not gain information about the compressibility of the data.

Figure 3:
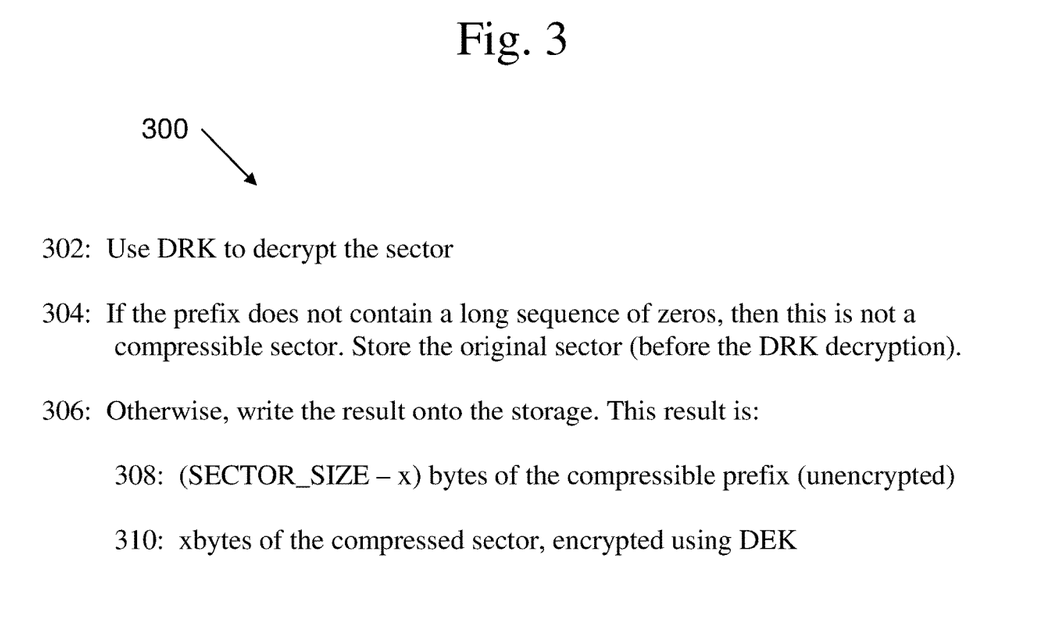
FIG. 3 is an exemplary pseudocode diagram of a write operation of a single sector on the storage side according to embodiments of the present systems and methods.

Storage system write process 300 may begin at 302, in which storage system 104 may receive data to be stored and may use DRK to decrypt the received data. At 304, storage system 104 may examine the decrypted received data. If the prefix does not contain a sufficiently long compressible sequence of, for example, zeros, then this is not a compressible sector and the received data before the DRK decryption, which is the DEK encrypted original sector, may be stored 114. Otherwise, at 306, the decrypted received data may be stored 114. This results in the stored data 114 including (SECTOR_SIZE-x) bytes of the compressible prefix (unencrypted) 308 and x bytes of the compressed sector 310, encrypted using DEK 108.

Note that the unencrypted prefix, which is written onto the storage system, contains a compressible pattern (for example, a sequence of zeros). In embodiments, the storage system may have data reduction capabilities which may lead to space savings.

Furthermore, embodiments may use deduplication friendly encryption in which identical sectors (in plaintext) may be written to the storage system as identical encrypted sectors. In embodiments, the storage system may have data reduction abilities based on deduplication, which may lead to further space savings.

Figure 4:
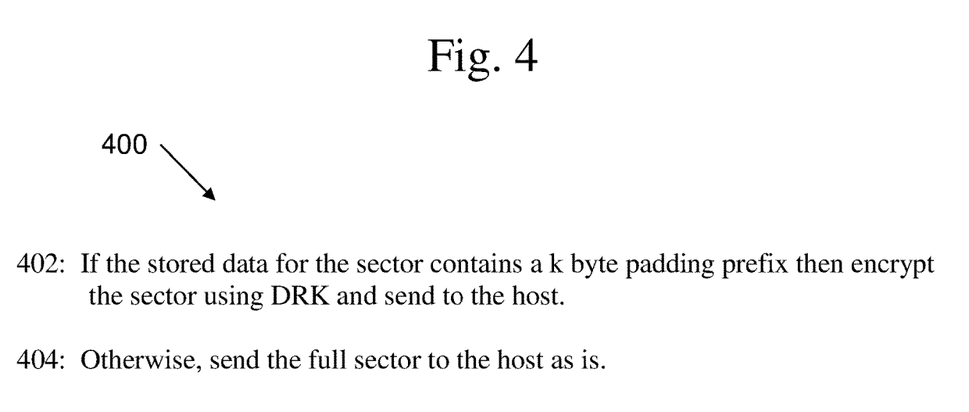
FIG. 4 is an exemplary pseudocode diagram of a read operation of a single sector on the storage side according to embodiments of the present systems and methods.

An exemplary flow diagram of a process 400 of reading data from a storage system 104 according to the present techniques is shown in FIG. 4. It is best viewed in conjunction with FIG. 1. Storage system read process 400 may begin at 402, in which, if the stored sector 116 contains a k byte padding prefix, then sector 116 may be encrypted using DRK 126 and sent to host 102. Otherwise, at 404, if the sector 116 does not have a k byte padding prefix, then sector 116 is not compressed and sector 116 may be sent to host 102 as is.

Figure 5:
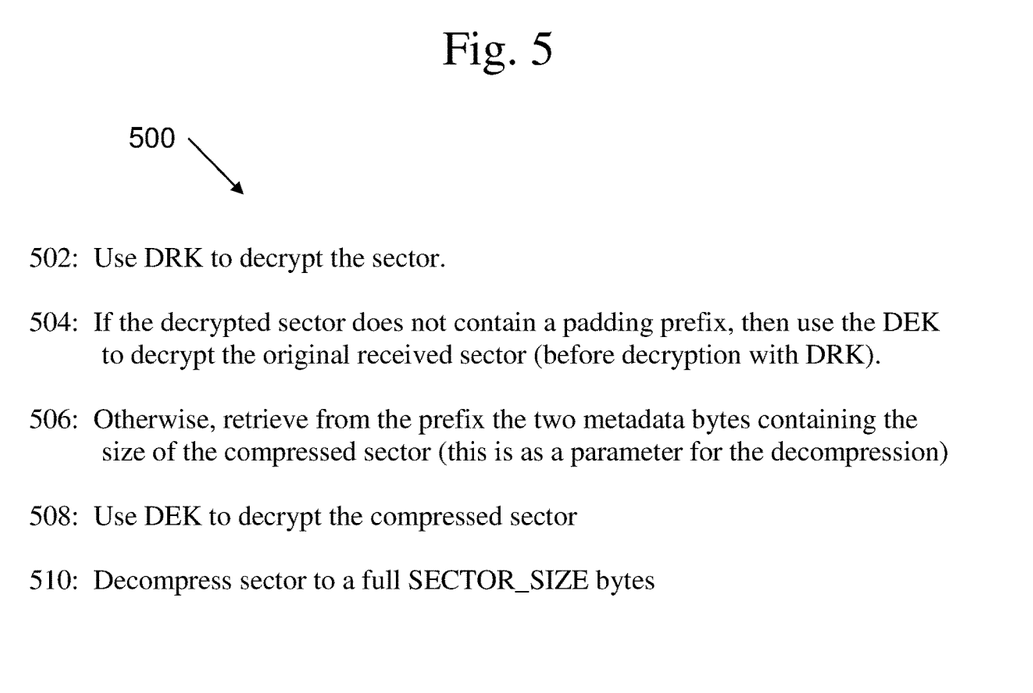
FIG. 5 is an exemplary pseudocode diagram of a read operation of a single sector on the host side according to embodiments of the present systems and methods.

Host side read process 500 may begin with 502, in which the data received from storage system 104 may be decrypted using DRK 126. At 504, if this yields a decrypted sector that does not contain a padding prefix, then the original received data from storage system 104 (before decryption with DRK), which is a DEK encrypted sector, may be decrypted using DEK 124 to obtain sector 122.

At 506, otherwise, if the decrypted sector does include a padding prefix, then the metadata, for example, two bytes indicating the size of the compressed sector, may be obtained from the prefix. The metadata may be used as a parameter for the decompression. At 508, DEK 124 may be used to decrypt the compressed sector to form a compressed sector. Then, at 508, metadata 308 may be used to decompress the compressed sector to a full SECTOR_SIZE bytes to form sector 122.

In many encryption mechanisms, the result of a sector encryption may depend on the data, on the encryption key, and on an initialization vector (IV). The IV may be used to prevent identical plaintext sectors from being encrypted to the same encrypted sector. In embodiments, the IV may be computed, for example, from the sector number.

Embodiments of the present systems and methods may encrypt compressible data in a way that supports deduplication. In order to achieve deduplication, identical plaintext sectors should map to identical encrypted sectors on the storage system. Therefore, in embodiments, the IV may not be derived from the sector number. Instead, embodiments may derive the IV from a keyed-hash (the key being, for example, the DEK) of the plaintext data. For example, embodiments may use a SHA256 of the DEK concatenated with the sector data. This IV may be added to the encrypted sector in order to allow decryption. For this reason, if the protocol between the host and the storage system is unchanged, embodiments may only do this for compressible data, since the free space in the sector may be used for storing the IV data. In embodiments, encryption with DRK may hide deduplication opportunities and would therefore use standard sector-based IVs.

Embodiments may handle non-compressible sectors. In a write operation, if the host determines that a sector is non-compressible, embodiments may encrypt the sector as before using the DEK with the IV derived from the sector number. This encrypted sector may be sent to the storage system. The storage system may determine whether to treat this encrypted sector as a compressed or uncompressed sector. If it is uncompressed, then it should be written as-is. If it is compressed, then the prefix sector may be decrypted before being written to storage. One way to make the determination whether the sector is compressible is to use the DRK to attempt to decrypt the beginning of the encrypted sector. If the result contains the compressible pattern, then the sector is compressible.

Additional features that may be implemented in embodiments of the present systems and methods may include, for example, a performance enhancement in which the host may mark compressible sectors by making all of them begin with one zero byte (thereby reducing the size of the DRK encrypted prefix by one byte). The storage would know for certain that any sector not beginning in a zero byte is not compressible. If the storage receives a sector beginning with a zero, then there is a chance that it is not compressible, and that the encrypted sector just happens to begin with a zero byte. The storage could make a final determination by attempting to decrypt the beginning of the prefix using the DRK, as described above. While this may leak some information about whether a sector is compressible or not (but not about the level of compressibility), it may greatly reduce the number of unnecessary decryption attempts on non-compressible sectors.

Further, rather than sending 1 zero byte to indicate that the sector is compressible, embodiments may send several zero bytes. If, for example, a compressible sector is denoted by 3 zero bytes, then the chance of a sector being incorrectly identified as a compressible sector (leading to the storage system needlessly attempting to decrypt it with the DRK) is 1 in 256^3.

Another embodiment may be to include metadata that indicates whether or not a chunk is DRK encrypted, and a key_ID indicating which DRK key was used. For example, a couple of bits may be added for different keys to allow non-disruptive key rotation.

In embodiments, the protocol between the host and the storage system may be changed to pass along, for example, an additional single bit indicating whether the sector is compressible or not. This will prevent needless decryption of uncompressible sectors with the DRK.

Embodiments may include a storage system that does not support deduplication. In such embodiments, all encryptions may make use of an IV derived from the sector number—it is not necessary to make sure that identical plaintext sectors are transformed to identical encrypted sectors. In embodiments in which the storage system does support deduplication, identical encrypted sectors may be transformed to identical encrypted sectors, so the encrypted data may be encrypted again to prevent an adversary from gaining information about the deduplicability of the data (by identifying identical encrypted sectors). Therefore, in embodiments that do not support deduplication, the host may encrypt only the prefix with the DRK. The compressed data may be encrypted only once with the DEK (with no further DRK encryption).

In embodiments, the storage may not decrypt the entire prefix. It may decrypt only a short prefix or portion of the prefix including the metadata bytes and a compressible pattern (for example, 30 zero bytes). The compressible pattern may serve as sufficient proof that the data was indeed compressed, and from the metadata the length of the full compressible pattern may be determined. Thus, there would be no need to decrypt the rest of the encrypted compressible pattern when the storage already knows that the plain text is the compressible pattern. The same may apply to the operation on the host side during reads.

In embodiments, the storage system may take advantage of the fact that compression is done on the host side in order to improve the performance of its data reduction capabilities. If the storage system identifies a compressed sector, then it immediately learns that there is a compressible pattern followed by a sequence of compressed and encrypted data (which cannot be further compressed). There is no point for the storage system to attempt to compress uncompressible data. Nor is there any point in using sophisticated compression algorithms to try to compress a compressible pattern (for example, a sequence of zeros) as the compressible pattern may simply be removed and not stored. Upon a read, if a sector is shorter than SECTOR_SIZE, then the storage may fill in the padding prefix before re-encrypting with the DRK.

Embodiments may include a storage system that does support deduplication. In such embodiments, the prefix of compressed sectors may contain the hash of the data (the initialization vector). If the storage system has deduplication capabilities, then it may make use of this hash for deduplication. This may have two benefits: a) it can relieve the storage system of the need to recompute the hash, and b) the storage typically will decrypt the data part using DRK, but if the storage system determines that an identical sector already exists (based on the hash), then it need not decrypt the compressed data at all.

The key-compressible algorithm described allows a storage with deduplication capabilities to identify sequences of identical sectors among the compressible sectors. However, it cannot identify sequences of identical sectors among the uncompressible sectors, or among a mix of compressible and uncompressible sectors. Embodiments may provide this functionality by changing the protocol between the host and the storage system to include the hashes of the uncompressible sectors, encrypted using the DRK. Once these hashes are decrypted on the storage system, the storage system may utilize the information regarding the hashes of both compressible and uncompressible sectors to perform deduplication on all the encrypted data.

Figure 6:
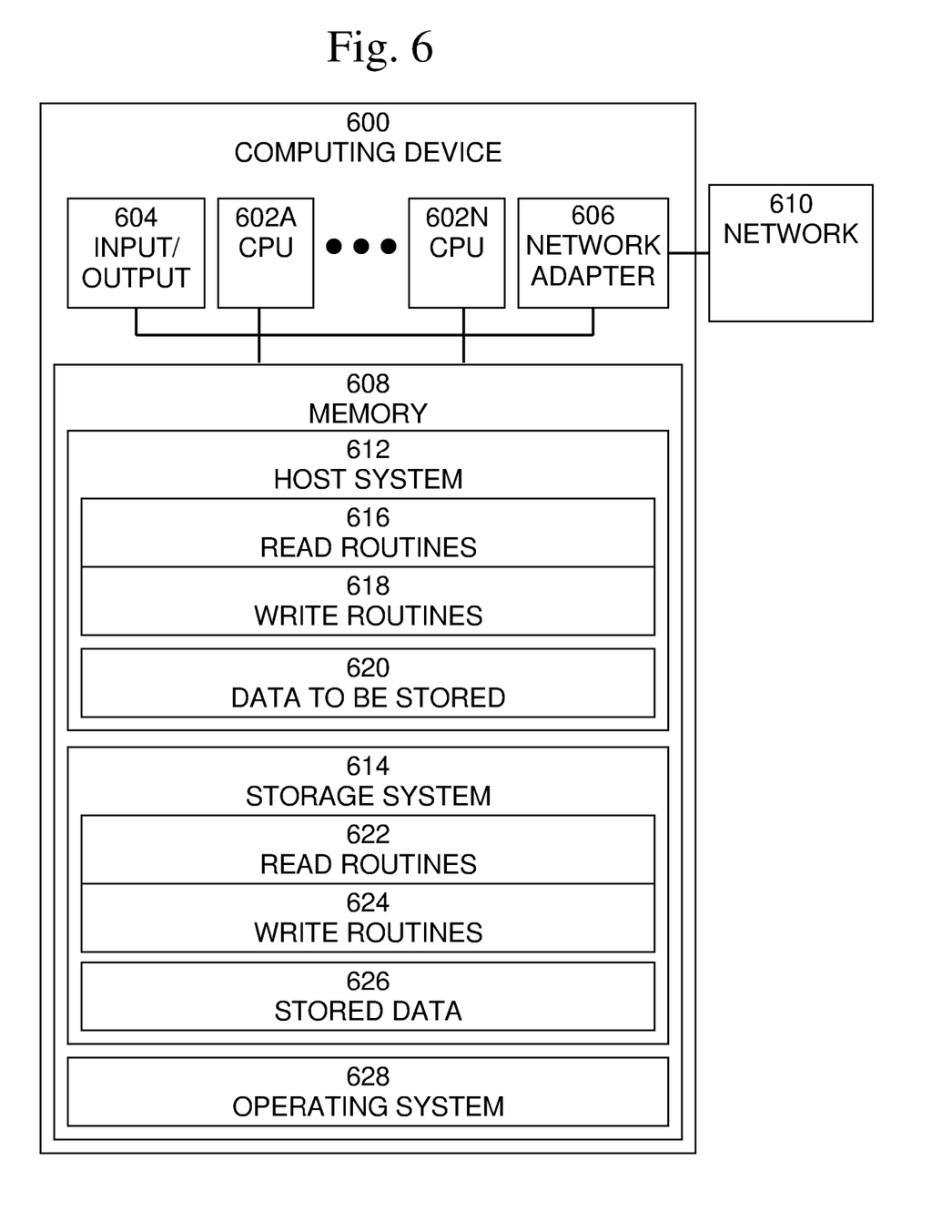
FIG. 6 is an exemplary block diagram of a computer system, in which processes involved in the embodiments described herein may be implemented.

An exemplary block diagram of a computer system 600, in which processes involved in the embodiments described herein may be implemented, is shown in FIG. 6. Computer system 600 may be implemented using one or more programmed general-purpose computer systems, such as embedded processors, systems on a chip, personal computers, workstations, server systems, and minicomputers or mainframe computers, or in distributed, networked computing environments. Computer system 600 may include one or more processors (CPUs) 602A-602N, input/output circuitry 604, network adapter 606, and memory 608. CPUs 602A-602N execute program instructions in order to carry out the functions of the present communications systems and methods. Typically, CPUs 602A-602N are one or more microprocessors, such as an INTEL CORE® processor. FIG. 6 illustrates an embodiment in which computer system 600 is implemented as a single multi-processor computer system, in which multiple processors 602A-602N share system resources, such as memory 608, input/output circuitry 604, and network adapter 606. However, the present communications systems and methods also include embodiments in which computer system 600 is implemented as a plurality of networked computer systems, which may be single-processor computer systems, multi-processor computer systems, or a mix thereof.

Input/output circuitry 604 provides the capability to input data to, or output data from, computer system 600. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 606 interfaces device 600 with a network 610. Network 610 may be any public or proprietary LAN or WAN, including, but not limited to the Internet.

Memory 608 stores program instructions that are executed by, and data that are used and processed by, CPU 602 to perform the functions of computer system 600. Memory 608 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 608 may vary depending upon the function that computer system 600 is programmed to perform. In the example shown in FIG. 6, exemplary memory contents are shown for both host systems 612 and storage systems 614. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 6, memory 608 may, for a host system 612, include read routines 616, write routines 618, and data to be stored 620, for a storage system 614, read routines 622, write routines 624, and stored data 626, and operating system 628. Host system read routines 616 may include software routines that implement host system read processes as described above. Host system write routines 618 may include software routines that implement host system write processes as described above. Data to be stored 620 may include data on a host system that is to be stored to a storage system as described above. Storage system read routines 622 may include software routines that implement storage system read processes as described above. Storage system write routines 624 may include software routines that implement storage system write processes as described above. Stored data 626 may include data from a host system that has been stored to a storage system as described above. Operating system routines 628 may provide overall system functionality.

As shown in FIG. 6, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or sector of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented in a computer system comprising a processor, memory accessible by the processor, computer program instructions stored in the memory and executable by the processor, and data stored in the memory and accessible by the processor, the method comprising:
   compressing, at the computer system, an original sector of data to generate a portion of a new sector of data;
   comparing an amount of compression between the original sector of data and the portion of the new sector of data;
   when the amount of compression is greater than or equal to a predetermined amount:
      encrypting, at the computer system, the portion of the new sector of data using a first key;
      appending, at the computer system, to the encrypted portion metadata and padding data to form the new sector of data;
      encrypting, at the computer system, the new sector of data using a second key; and
      transmitting, at the computer system, the encrypted new sector of data to a storage system
   when the amount of compression is less than the predetermined amount:
      encrypting, at the computer system, the original sector of data using the first key, to form an encrypted original sector of data; and
      transmitting, at the computer system, the encrypted original sector of data to the storage system.

2. The method of claim 1, wherein:
   the storage system decrypts at least a portion of the sector sent from the computer system using the second key and uses the existence or absence of a compressible pattern to determine whether the transmitted data is compressed;
   when the sector is determined to be not compressed, then the storage system stores the uncompressed original sector of data without modification;
   when the sector is determined to be compressed, then the storage system decrypts the sector sent by the host using the second key and stores the decrypted new sector of data; and
   when the storage system has built in compression capabilities, the storage system utilizes the compressible pattern to save storage space.

3. The method of claim 2, further comprising:
   receiving, at the computer system, an encrypted sector of data from the storage system;
   decrypting, at the computer system, at least a sector of the encrypted sector of data using the second key;

determining, at the computer system, based on the presence of padding data in at least a portion of the decrypted sector of data, whether the sector of data includes compressed data;

when the sector of data is compressed, decrypting, at the computer system, the compressed data using the first key and decompressing, at the computer system, the decrypted compressed data; and when the sector of data is not compressed, decrypting, at the computer system, using the first key, the encrypted sector of data without decompressing;

wherein the metadata comprises a value of a compressed length of the original sector of data, and the value may be used to decompress the compressed data after the compressed data is decrypted using the second key.

4. The method of claim 3, wherein the storage system transmits an encrypted sector of data by:

determining, at the storage system, whether a stored sector includes padding data;

when the stored sector includes padding data, encrypting, at the storage system, the stored sector using the second key to form the encrypted sector and transmitting to the computer system the encrypted sector; and when the stored sector does not include padding data, transmitting to the computer system the stored sector as the encrypted sector.

5. The method of claim 1, further comprising encrypting data using the first key and an initialization vector such that:

when the data is to be transmitted to a storage system supporting deduplication, generating, at the computer system, an initialization vector that is identical for different sectors of identical data; and adding the initialization vector as part of the metadata for future decryption with the first key; and when the data is not compressible, then generating an initialization vector based on a sector number.

6. The method of claim 5, wherein the future decryption using the first key is performed using the initialization vector included in the metadata.

7. A system comprising a processor, memory accessible by the processor, computer program instructions stored in the memory and executable by the processor, and data stored in the memory and accessible by the processor to perform:

compressing an original sector of data to generate a portion of a new sector of data;

comparing an amount of compression between the original sector of data and the portion of the new sector of data;

when the amount of compression is greater than or equal to a predetermined amount:

encrypting the portion of the new sector of data using a first key;

appending to the encrypted portion metadata and padding data to form the new sector of data;

encrypting the new sector of data using a second key; and transmitting the encrypted new sector of data to a storage system when the amount of compression is less than the predetermined amount:

encrypting the original sector of data using the first key, to form an encrypted original sector of data; and transmitting the encrypted original sector of data to the storage system.

8. The system of claim 7, wherein:

the storage system decrypts at least a portion of the sector sent from the computer system using the second key, and uses the existence or absence of a compressible pattern to determine whether the transmitted data is compressed;

when the sector is determined to be not compressed, then the storage system stores the uncompressed original sector of data without modification;

when the sector is determined to be compressed, then the storage system decrypts the sector sent by the host using the second key and stores the decrypted new sector of data; and when the storage system has built in compression capabilities, the storage system utilizes the compressible pattern to save storage space.

9. The system of claim 8, further comprising:

receiving an encrypted sector of data from the storage system;

decrypting at least a sector of the encrypted sector of data using the second key;

determining based on the presence of padding data in at least a portion of the decrypted sector of data, whether the sector of data includes compressed data;

when the sector of data is compressed, decrypting the compressed data using the first key and decompressing the decrypted compressed data; and when the sector of data is not compressed, decrypting using the first key, the encrypted sector of data without decompressing;

wherein the metadata comprises a value of a compressed length of the original sector of data, and the value may be used to decompress the compressed data after the compressed data is decrypted using the second key.

10. The system of claim 9, wherein the storage system transmits an encrypted sector of data by:

determining, at the storage system, whether a stored sector includes padding data;

when the stored sector includes padding data, encrypting, at the storage system, the stored sector using the second key to form the encrypted sector and transmitting to the computer system the encrypted sector; and when the stored sector does not include padding data, transmitting to the computer system the stored sector as the encrypted sector.

11. The system of claim 7, further comprising encrypting data using the first key and an initialization vector by:

when the data is to be transmitted to a storage system supporting deduplication, generating, at the computer system, an initialization vector that is identical for different sectors of identical data; and adding the initialization vector as part of the metadata for future decryption with the first key; and when the data is not compressible, then generating an initialization vector based on a sector number.

12. The system of claim 11, wherein the future decryption using the first key is performed using the initialization vector included in the metadata.

13. A computer program product comprising a non-transitory computer readable storage having program instructions embodied therewith, the program instructions executable by a computer system, to cause the computer system to perform a method comprising:

compressing, at the computer system, an original sector of data to generate a portion of a new sector of data;

comparing an amount of compression between the original sector of data and the portion of the new sector of data;

when the amount of compression is greater than or equal to a predetermined amount:

encrypting, at the computer system, the portion of the new sector of data using a first key;

appending, at the computer system, to the encrypted portion metadata and padding data to form the new sector of data;

encrypting, at the computer system, the new sector of data using a second key; and transmitting, at the computer system, the encrypted new sector of data to a storage system when the amount of compression is less than the predetermined amount:

encrypting, at the computer system, the original sector of data using the first key, to form an encrypted original sector of data; and transmitting, at the computer system, the encrypted original sector of data to the storage system.

14. The computer program product of claim 13, wherein:

a storage system decrypts at least a portion of the sector sent from the computer system using the second key and uses the existence or absence of a compressible pattern to determine whether the transmitted data is compressed;

when the sector is determined to be not compressed, then the storage system stores the uncompressed original sector of data without modification;

when the sector is determined to be compressed, then the storage system decrypts the sector sent by the host using the second key and stores the decrypted new sector of data; and when the storage system has built in compression capabilities, the storage system utilizes the compressible pattern to save storage space.

15. The computer program product of claim 14, further comprising:

receiving, at the computer system, an encrypted sector of data from the storage system;

decrypting, at the computer system, at least a sector of the encrypted sector of data using the second key;

determining, at the computer system, based on the presence of padding data in at least a portion of the decrypted sector of data, whether the sector of data includes compressed data;

when the sector of data is compressed, decrypting, at the computer system, the compressed data using the first key and decompressing, at the computer system, the decrypted compressed data; and when the sector of data is not compressed, decrypting, at the computer system, using the first key, the encrypted sector of data without decompressing;

wherein the metadata comprises a value of a compressed length of the original sector of data, and the value may be used to decompress the compressed data after the compressed data is decrypted using the second key.

16. The computer program product of claim 15, wherein the storage system transmits an encrypted sector of data by:

determining, at the storage system, whether a stored sector includes padding data;

when the stored sector includes padding data, encrypting, at the storage system, the stored sector using the second key to form the encrypted sector and transmitting to the computer system the encrypted sector; and when the stored sector does not include padding data, transmitting to the computer system the stored sector as the encrypted sector.

17. The computer program product of claim 13, wherein:

the method further comprises encrypting data using the first key and an initialization vector by:

when the data is to be transmitted to a storage system supporting deduplication, generating, at the computer system, an initialization vector that is identical for different sectors of identical data; and adding the initialization vector as part of the metadata for future decryption with the first key and when the data is not compressible, then generating an initialization vector based on a sector number; and the future decryption using the first key is performed using the initialization vector included in the metadata.

* * * * *